UNITED STATES PATENT OFFICE.

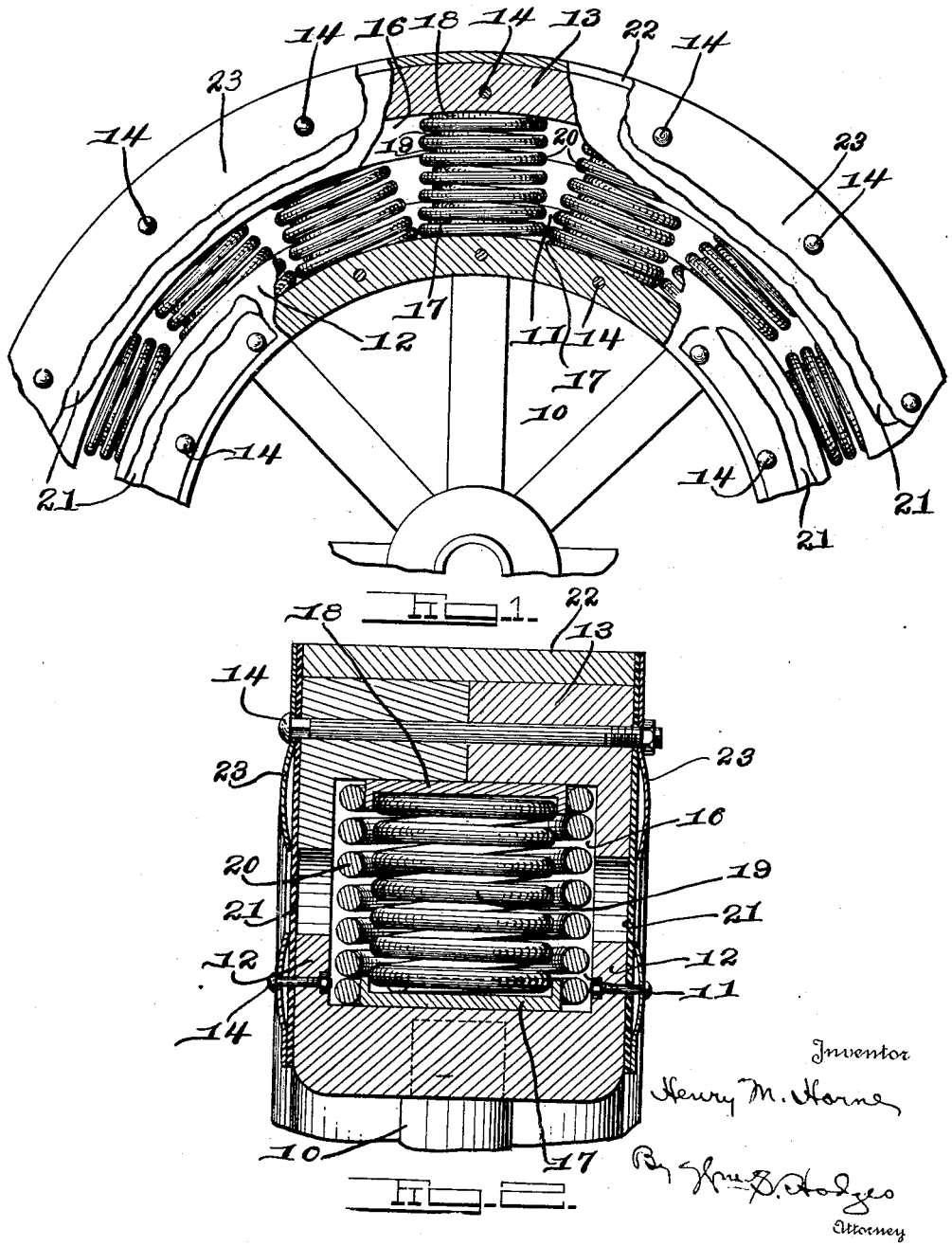

HENRY M. HORNE, OF SULPHUR SPRINGS, TEXAS, ASSIGNOR OF FIFTY-ONE ONE-HUNDREDTHS TO JOHN C. BUFORD, OF SULPHUR SPRINGS, TEXAS.

SPRING-WHEEL.

1,198,230.    Specification of Letters Patent.    Patented Sept. 12, 1916.

Application filed September 11, 1915. Serial No. 50,138.

*To all whom it may concern:*

Be it known that I, HENRY M. HORNE, a citizen of the United States, residing at Sulphur Springs, in the county of Hopkins and State of Texas, have invented new and useful Improvements in Spring-Wheels, of which the following is a specification.

This invention is an improvement in spring wheels of the type employing a cushioned rim. Spring wheels of this type are usually open to the objection that the spring devices employed, are normally too resilient, and as a consequence permit of a very extensive movement radially, between the rim and the hub, resulting in unpleasant rebounding when the wheel passes obstructions or depressions in the road. Such constructions also require means independent of the spring devices, to prevent lateral movement of the rim relative to the hub, when the vehicle skids, or the wheel is subjected to unusual lateral strains.

One of the objects of the present invention is to overcome these objections by providing spring devices which will yield only under a relatively heavy pressure, and which will avoid sudden and extensive rebounds.

A further object is to provide spring devices of sufficient stiffness to hold the rim and the body of the wheel in alinement, when the wheel is subjected to lateral strains, thereby avoiding the necessity of weighting down the wheel with stiffening devices.

A further object is to provide simple and improved means for holding the spring devices in place, and to permit of their ready removal and replacement.

The invention will be hereinafter fully set forth and particularly pointed out in the claims.

In the accompanying drawing: Figure 1 is a side elevation of a portion of a wheel constructed in accordance with the invention, parts being shown in section. Fig. 2 is a transverse sectional view thereof.

Referring to the drawing, 10 designates the body of the wheel, which may be of any suitable or preferred construction, the periphery thereof being provided with an annular groove 11 formed by providing flanges 12. The rim 13 is preferably formed of two sections united by bolts 14, or similar devices, and each section is provided with an inwardly extended flange, said flanges coöperating to provide a groove 16 in the inner face of said rim. Secured in the grooves 11 and 16 respectively, are circular cups 17 and 18, the cups 17 being secured in the groove 11 and the cups 18 in the groove 16, each cup 18 being disposed opposite a cup 17. It will be observed that the flanges of the cups do not extend above the flanges forming the respective groove. Located between each pair of cups 17 and 18 are springs 19, the ends of which are seated in the respective cups, and encircling said springs are heavier springs 20, having their ends seated in the respective grooves 11 and 16, and encircling the flanges of the respective cups 17 and 18, whereby the ends of said springs are held against displacement. It will be observed that the convolutions of both sets of springs, are separated to a very slight extent, it being desirable to maintain the springs under such compression that a further compression of approximately one-fourth of the length of the springs, will bring the convolutions into contact, and thereby provide a rigid resistance to abnormal radial strains. It will also be noted that the bases of the springs 20, where they are seated in the grooves 11, contact with each other, thereby aiding the cups 17 in preventing creeping of the springs around the rim. By means of this arrangement the wheel is permitted to have sufficient resiliency for its normal operation, but because of the heavy initial compression of the springs, the rim will only yield to unusual strain, and where said strains are sufficient, they are met with practically a rigid resistance, by reason of the convolutions of the springs being brought into contact. By reason of heavy initial compression of the springs, rebound of the rim, after the wheel passes over an inequality in the road, is practically prevented, being resisted by the springs not under immediate increased compression. It is also apparent that by subjecting the springs to the heavy initial compression herein contemplated, and making said springs sufficiently heavy, relative lateral movement of the rim and the body of the wheel may be practically prevented, and the use of stiffening devices is rendered unnecessary. If desired, the space between the body of the wheel and the rim may be covered by suitable flexible material 21. By making the rim 13 in sections, the same may be readily separated, to permit of the removal and replacement of springs that may have become broken or injured while in use.

It will be observed that while the springs 20 are in contact at their bases, they do not contact at any other point, because of their radial relation on the body of the wheel, thereby avoiding possibility of injurious friction of the springs against each other, even when they have been compressed to their fullest extent. It will also be understood that the vibration of the casing with the springs, during the revolution of the wheel, will prevent mud and the like, from adhering to the working parts, thereby preventing clogging of the latter.

In practice, the flanges 12 are preferably formed integral with the body of the wheel by turning, although it is not desired to limit the invention in this particular. Also, if it should be found desirable or necessary, the tread portion of the rim may be provided with a tire of any suitable material, 22, lateral movement thereof being prevented by annular extensions of the spring plates 23 which aid in retaining the flexible covers 21 in position. One set of spring plates is retained in position by the bolts 14 and the other plates are secured to the flanges 12 by suitable bolts passing therethrough. These plates are preferably concavo-convex in cross section, to cause them to bear against the covers 21 with a resilient pressure.

Having thus explained the nature of my invention and described an operative manner of constructing and using the same, although without attempting to set forth all of the forms in which it may be made, or all of the forms of its use, what I claim is:—

1. An improved spring wheel comprising a body having a grooved periphery, an annular rim surrounding the periphery of said body and having a grooved inner face, and springs interposed between said body and said rim and having their ends seated in the respective grooves, the relative diameters of said body and said rim being such that the springs are placed under an initial compression, flexible covers on both sides of the wheel, extending over the gap between the body and the rim, spring members secured to the rim and the body and bearing against said covers, the spring members secured to the rim having their peripheral edges projecting beyond the periphery of the rim, and a tread secured between the projecting portion of said spring members.

2. An improved spring wheel comprising a circular body having its periphery provided with spaced apart annular flanges, a rim surrounding said body and formed of two abutting annular sections, each having a flange at one side, bolts for holding said sections together with the flanges spaced from each other and opposite the flanges of the body, spring members having their opposite ends bearing against the body and the rim respectively, flexible covers connecting the rim and the body, spring members secured by said bolts and bearing against said covers, bolts passing through the flanges of said body, and spring members secured by the last mentioned bolts and also bearing against said covers.

In testimony whereof I have hereunto set my hand.

HENRY M. HORNE.

Copies of this patent may be obtained for five cents each, by addressing the "Commissioner of Patents, Washington, D. C."